F. W. Reilly.
Exercising Mach.
Nº 90,304. Patented May 18, 1869.

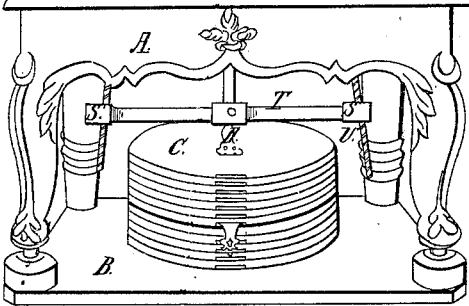

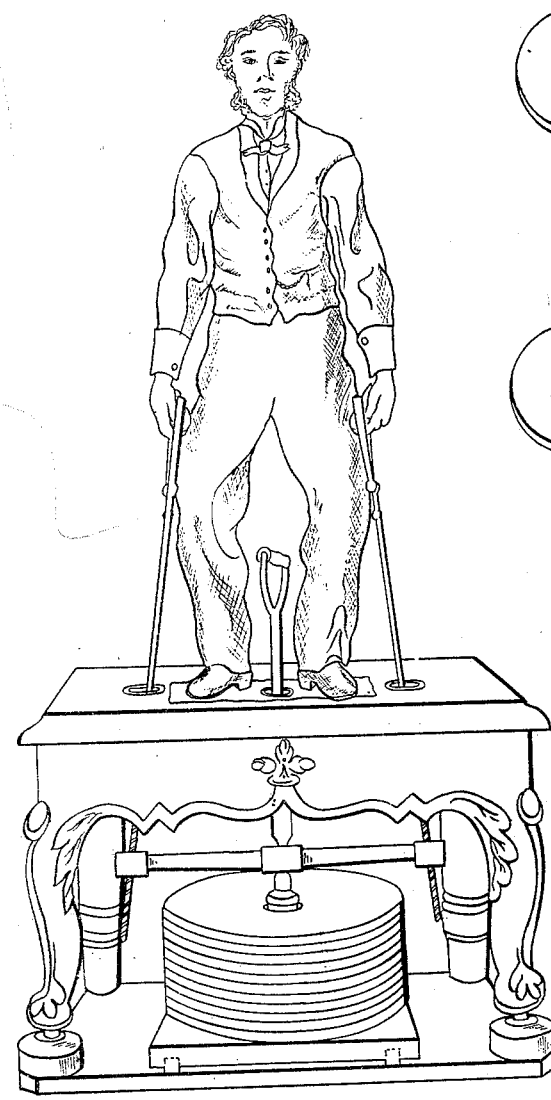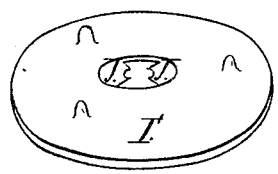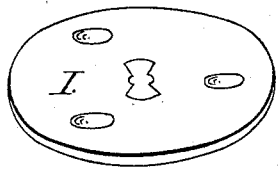

Witnesses.
J. A. Wilson
W. F. Hodges.

Inventor.
Frank W. Reilly

UNITED STATES PATENT OFFICE.

FRANK W. REILLY, OF CHICAGO, ILLINOIS.

IMPROVEMENT IN WEIGHT-LIFTING APPARATUS.

Specification forming part of Letters Patent No. 90,304, dated May 18, 1869.

*To all whom it may concern:*

Be it known that I, FRANK W. REILLY, of the city of Chicago, in the county of Cook and State of Illinois, have invented new and useful Improvements in Weight-Lifting Apparatus; and I do hereby declare that the following is a full and exact description thereof, reference being had to the accompanying drawings, making part of this specification, in which—

Sheet 1: Figure 1 represents the perspective view of the apparatus. Fig. 2 represents the top, and Fig. 3 represents the bottom, views of the weights used. Figs. 4 4' 4'' represent the front views of weight-shafts. Fig. 5 represents a weight-shaft, cross-bar or yoke, and handle-rods in proper relation. Figs. 6, 6', 6'', 6''' represent various styles of keys or pins. Fig. 7 represents a cross-bar or yoke. Fig. 7' represents a movable nut, by which the handle-rod is secured to the yoke or cross-bar. Fig. 8 represents foot of table-leg, with section of spring and socket therefor. Fig. 9 represents the handle or grasping-piece.

Figure 13:
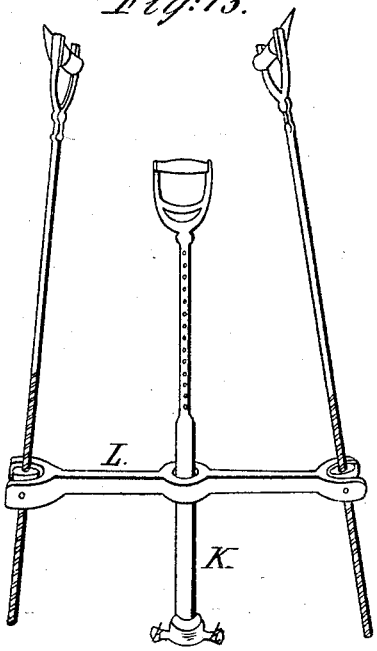

Sheet No. 2: Fig. 10 represents another perspective view of the apparatus. Fig. 11 represents the top, and Fig. 12 represents the bottom, views of the weights. Fig. 13 represents the weight-shaft, cross-bar, and handle-rods.

Figure 14:
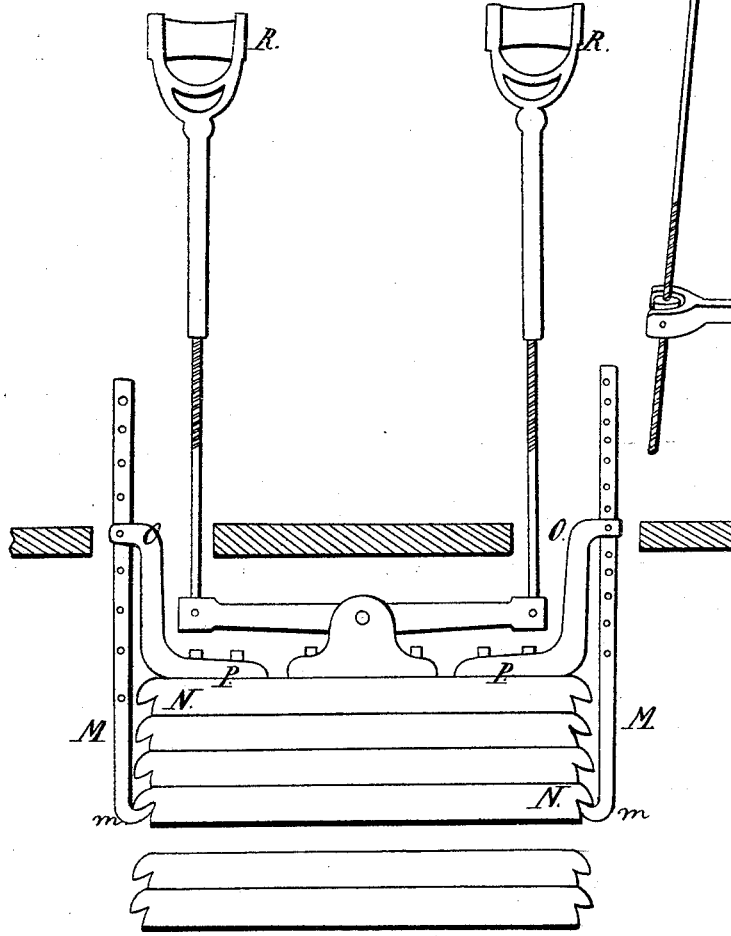

Sheet No. 3: Fig. 14 represents a sectional view of the apparatus.

My invention consists of an improved form of apparatus designed to facilitate the practice of lifting weights, either as a gymnastic exercise or a curative agency in the treatment of disease; and to make it clearly understood, I shall first proceed to describe the common contrivance heretofore in use in gymnasiums and elsewhere, designed for the same purpose, and shall then point out the nature of my improvements.

The apparatus heretofore in use embraces a table or platform, four feet or so in height and about three feet square, in the center of which is a strong rod, terminating in an eye at its upper extremity, or having attached to it, below the table, a cross-bar, carrying two vertical rods, provided with suitable handles, and passing through the table to a point near the floor, where its lower end is firmly secured to a horizontal disk, tray, or spider. Upon this disk, tray, or spider the weights used are deposited or piled by hand beneath the table, involving much unpleasant and fatiguing labor in a cramped and disadvantageous position, and subjecting the individual operating the apparatus to the danger of rupture or other injury, as well as to a useless expenditure of time.

There have been various modifications in the construction of this kind of lifting apparatus, for some of which patents have been heretofore granted by the United States Patent Office to D. P. Butler; but Mr. Butler's apparatus, like those of his predecessors, contains the general feature of a disk, tray, or spider beneath the table or platform, and movable weights, to be taken therefrom or placed thereon by hand, thereby involving the labor and dangers aforesaid, and limiting the use of the apparatus, especially in the cases of ladies, children, and invalids.

The object of my improvement is to obviate the necessity of this labor and its attendant dangers and unpleasantness, as well as to economize time and to render the use of weight-lifting apparatus for gymnastic or hygienic purposes more widely available.

I accomplish this by having the weights cast in the form of plates, of any convenient form or size, and provided with suitable slots, grooves, or holes, into which a key or pin may be inserted, attaching one or more of a series of said plates to the central rod or weight-shaft, which rod or shaft passes through the center of said series of plates, receiving the key or pin in a suitable aperture, by which all the plates resting on said key are firmly attached to said rod or shaft, which is then lifted or raised in any of the well-known ways.

My apparatus consists of a substantial table, A, the legs of which rest on a suitable platform, B, either with or without the interposition of springs, according to the modes now in use.

On said platform a series of plates, C C' C'', are placed, through the center of which passes the rod or weight-shaft D, which is pivoted to the center of the cross-bar T, in the ends of which are boxes S', for the reception of the nut S, through which the handle-rods U pass. The nut S slides loosely into the box, which prevents it from turning, but allows free movement of the handle-rod. The cross-bar, with its boxes, is cast in one piece, and a composition nut is used, so as to prevent wearing the screw-threads on the handle-rods. When the nut wears it is easily replaced by a new one.

The shaft D is provided with holes $d\ d\ d$ or notches $d'\ d'$.

In the slot E, on the under surface of the plates, the key F F F F is placed, the end of said key engaging in the weight-shaft, and securely keying or attaching all the plates above the key to the weight-shaft.

The better to secure the correct position of the plates as they descend after having been raised, I construct the plates with lugs or projections G G G, on either the upper or under surface, and provide corresponding inclined depressions H H H on the opposite surface, so that the plates may be guided as they descend into their original position, with reference to the relation of the slots in their under surfaces and the apertures in the weight-shaft.

I have also shown, in Sheet No. 3 of drawings, a mode of dividing the weight, in which the plate I I' has two recesses, J J, in the under surface $l'$, in which recesses the toes $k\ k$ of the weight-shaft K engage, said weight-shaft being pinned to a collar resting on the cross-bar L, or terminating in an eye above the table, as before described.

I have also shown, in Sheet No. 3, a mode of accomplishing the same result by means of two rods, M M, terminating in hooks or dogs $m\ m$, which hooks or dogs bite into the recessed edges of the plates N N; and the rods being suitably confined by pins, notches, or other device, to brackets O O, securely bolted to the top plate, P, it is apparent that when the top plate is raised, by means of the handles R R, or in any other well-known way, the hooked rods will carry up the plates in which they are engaged and those resting upon it. A spring may also be used to press the hook or dog into its place.

I have also thought of cutting a female thread in the central hole through the weight-plates, and a corresponding male-thread upon the weight-shaft by means of which threads the weight-shaft may be made to engage in any desired number of the weight-plates, which may then be lifted in the usual way.

Where it is desired to lift a suspended weight, as in some of the apparatus now in use, the platform on which the plates rest may be raised or lowered by means of a screw or gear in order to engage or release the necessary number of plates to or from the suspended weight-shaft; or the weight-shaft may be raised or lowered in like manner, as will be readily understood by the skilled mechanic; but in either case the weights and weight-shaft would have to be adapted to that end.

I have also contemplated providing each plate with a key or pin, to be operated by an eccentric attached to a rod projecting above the table within the reach of the person using the apparatus, and so enabling him (or her) to adjust the amount of weight without descending from the table, as will be understood by those skilled in the use of weight-lifting apparatus for the above purpose.

By the use of any of these devices above described, or modifications thereof, which will readily suggest themselves to the skilled and expert mechanic, it will be seen that the noise, inconvenience, danger, labor, and outlay of time necessary to the use of the apparatus as heretofore constructed are avoided, and that instead of handling heavy masses of iron in a stooping and inconvenient position, as in raising them from the floor and depositing them on the tray, disk, or spider beneath the table, or in removing them thence again to the floor, the simple insertion of a key or pin in the weight desired to be raised is sufficient; and to this end I have invented and use, first, the weight-plate, constructed substantially as described, with a groove, slot, or hole, by which a key or pin, in connection with a perforated or notched weight-shaft, attaches the weight-plate to be lifted to the shaft; second, the lugs, or projections on the weight-plates, in connection with corresponding inclined depressions, as described, serving to guide the weight-plate into its original position after having been raised; third, the key or pin, in connection with a perforated or notched weight-shaft and a grooved, slotted, or perforated weight-plate, as described; fourth, the equivalent device by which hooked rods are made to bite into the edges of weight-plates, for the purpose set forth, as described.

I do not wish to be restricted to any particular or specific devices, but claim broadly as my own invention and desire to secure by Letters Patent—

1. An arrangement, in connection with weights to be lifted, by which a portion of a given amount of weight may be raised, as desired, without the necessity of displacing or replacing the remainder.

2. So constructing the weights of a series adapted for use in a lifting apparatus that they shall always return to their original relative positions.

3. The weight-plate C C' C'', when adapted to receive the pin or key F, as and for the purpose described.

4. The weight-plate C C' C'', having the lugs G G G and depressions H H H, as and for the purpose described.

5. The weight-shaft D, perforated or slotted substantially as and for the purpose described.

6. Connecting the handle-rods of a lifting apparatus to the cross-bar by means of the nut S, working in the box S', as shown and described, for the purposes specified.

FRANK W. REILLY.

Witnesses:
  W. F. HODGES,
  T. A. WILSON.